3,274,179
3-HALOETHYNYL-3-HYDROXY DERIVATIVES OF THE ANDROSTANE-17-ONE AND PREGNANE-20-ONE SERIES
Burton G. Christensen, Scotch Plains, N.J., assignor to Merck & Co., Inc., Rahway, N.J., a corporation of New Jersey
No Drawing. Filed Mar. 19, 1964, Ser. No. 353,276
8 Claims. (Cl. 260—239.55)

This invention is concerned with 3-hydroxy-pregnanes and androstanes which are also substituted at the 3 position with hydrocarbon or halogenated hydrocarbon groups such as phenyl, alkyl, ethynyl or haloethynyl groups, with processes for their preparation and with novel intermediates so produced. The compounds of this invention have pyrogenic properties and are useful diagnostic agents for testing adrenal function where it is necessary to determine the functional state of the adrenal glands as in adrenal tumors or adrenal tuberculosis. They may also be used in the treatment of arthritis in those cases where pyrogenic agents are utilized to effect temporary remission.

Pyrogenic agents within the scope of this invention may be represented by the formulas:

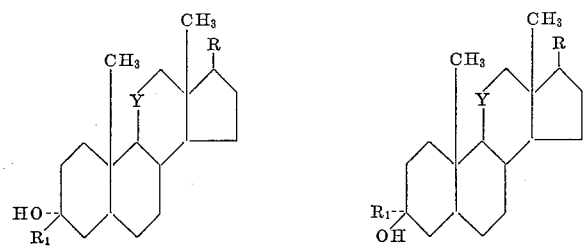

wherein Y is carbonyl or methylene; R is acetyl or a doubly bonded oxygen atom and $R_1$ is phenyl, lower alkyl such as methyl, ethyl, propyl, butyl, amyl and the like; ethynyl or haloethynyl such as chloroethynyl or bromoethynyl. With those compounds where R is a doubly bonded oxygen atom, Y is methylene.

The starting compounds used in the presently preferred process for preparing the compounds of this invention are 3-hydroxy-pregnane-11,20-dione; 3 - hydroxy - pregnane-20-one and 3-hydroxy-androstane-17-one.

In the first step of the process, the oxo group at the 20-position of the pregnane or the 17-position of the androstane is blocked or protected with a group which may later be easily removed. It is preferred to block these groups by forming alkylene dioxy derivatives such as ethylene ketals. These derivatives, when 3α-hydroxy compounds are used as starting materials, may be represented by the formulas:

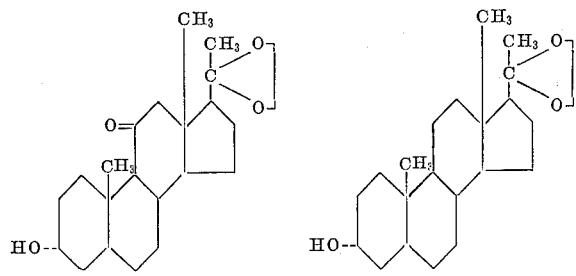

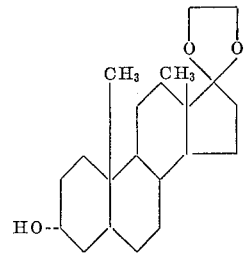

The ketal derivatives are prepared by reaction between the steroid and alkylene glycol in the presence of an acid catalyst with or without a reaction inert organic solvent. In a preferred procedure, the steroid is reacted with an excess of ethylene glycol in the presence of a catalytic amount of p-toluenesulfonic acid monohydrate at an elevated temperature while distilling off the by-product water.

The next step is oxidation to provide 3-oxo derivatives of the compounds whose formulas are shown above. Oxidation may be effected using any convenient reagent which will not adversely affect the steroid. The pyridine-chromium trioxide reagent is especially useful. In a preferred procedure, the steroid is taken up in pyridine and added to pyridine containing the oxidizing agent at a low temperature.

The oxidation product is then reacted with an organometallic compound, suitably a hydrocarbon magnesium halide, i.e. a Grignard reagent to substitute the desired grouping at the 3-position. For example, the phenyl group is substituted by reaction of the steroid with a phenyl magnesium halide such as phenyl magnesium bromide in a reaction inert organic solvent, suitably ether. An excess of a Grignard reagent is utilized so as to insure as complete a reaction as possible. The reaction is generally completed by heating under reflux conditions for from one to four hours.

Alkyl radicals are substituted by reaction of the steroid with alkyl Grignard reagent under similar conditions.

Reaction of the ketal compound with a lithium haloethyne forms the corresponding haloethynyl compound. In a preferred embodiment of this procedure, the lithium haloethyne is formed in situ by reaction of 1,2-dichloroethylene (preferably in the cis form), with methyl lithium in an inert organic solvent. For example, 3-hydroxy-3β-chloroethynyl-pregnane-11,20-dione 20-ethylene ketal is prepared by adding a solution of cis-1,2-dichloroethylene in ether to an ethereal solution of methyl lithium at about 0° C., stirring the mixture under nitrogen for about one hour, adding an ethereal solution of the steroid and stirring for an additional several hours. The use of an inert atmosphere is not essential, but helps minimize side reactions.

An ethynyl group is substituted by reaction of the steroid with acetylene magnesium bromide. A solution of the steroid in a reaction inert solvent such as tetrahydrofuran is added to a solution of acetylene magnesium bromide in the same solvent while bubbling acetylene through the mixture. For maximum yields, it is desirable to employ an excess of acetylene magnesium bromide. Reaction takes place by permitting the mixture to stand from 4 to 16 hours at room temperature or above.

Each of the reactions of the steroid with an organometallic compound produces an isomeric mixture of 3α and 3β hydroxy compounds further substitued with the organic portion of the organometallic compound. The mixture may be separated chromatographically or by fractional crystallization.

The novel intermediates which are produced by the foregoing reactions may be represented by the following formulas which show the compounds in the 3α-hydroxy configuration:

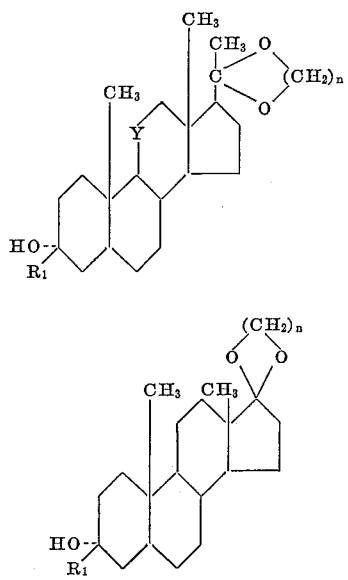

wherein Y and $R_1$ have the same meaning as above and $n$ is a small whole number such as 2 or 3.

In the final step of the process of this invention, a blocking group is removed. Ketal groups are removed by acid hydrolysis. In a preferred procedure, the ketal is allowed to stand in 90% acetic acid at room temperature for several hours. Alternatively, the ketal may be taken up in a reaction inert organic solvent such as acetone containing a small amount of p-toluenesulfonic acid and allowed to stand for several hours.

The compounds of this invention may be administered alone, or associated with a pharmaceutical carrier, the choice of which will depend upon the properties of the active compound and standard pharmaceutical practice. Dosage units may take the form of tablets, powders, capsules, elixirs or styrups which are particularly useful for oral ingestion. Liquid diluents are employed in sterile condition for parenteral use.

The following examples are given by way of illustration only and are not intended as limitations of this invention, many apparent variations are possible without departing from the spirit or scope thereof.

PREPARATION 1.—20-ETHYLENEDIOXY-3α-HYDROXY-PREGNANE-11,20-DIONE

A total of 20 g. of 3α-hydroxy-pregnane-11,20-dione 3-acetate is suspended in a mixture of one liter of ethylene glycol and 3.2 g. of p-toluenesulfonic acid monohydrate. The mixture is distilled over a period of four hours under water pump vacuum to collect 800 ml. of distillate. The reaction mixture is neutralized with anhydrous pyridine, poured into benzene and washed with water. The aqueous layer is extracted with additional benzene and the combined benzene layers washed three times with water, dried and concentrated in vacuo. The product is recovered by recrystallizing the residue from ether-petroleum ether.

Other alkylenedioxy compounds in which the alkylenedioxy group contains from 2 to 5 carbon atoms are similarly prepared from 3α-hydroxy-pregnane-20-one 11-acetate and 3α-hydroxy-androstane-17-one 3-acetate.

PREPARATION 2.—20-ETHYLENEDIOXY-PREGNANE-3,11,20-TRIONE

A solution of 3 g. of the product from the previous preparation in 30 ml. of dry pyridine is added to a cold stirred mixture of the oxidizing agent prepared by adding 3 g. of chromium trioxide in small portions with vigorous stirring to 30 ml. of anhydrous pyridine at 0–5° C. The reaction mixture is stirred until the steroid dissolves and allowed to stand overnight. It is poured into ice water and extracted several times with ether. The combined extracts are washed with water, dried and concentrated in vacuo to leave the desired product as a residue.

Other oxidation products of the compounds prepared by the procedure of Preparation 1 including 20-alkylenedioxy-pregnane-3,20-diones and 17-alkylenedioxy-androstane-3,17-dione in which the alkylenedioxy group contains from 2 to 5 carbon atoms are similarly prepared.

*Example 1.—20 - ethylenedioxy - 3α-hydroxy-3β-phenyl-pregnane - 11,20 - dione and 20-ethylenedioxy-3β-hydroxy-3α-phenylpregnane-11,20-dione*

A warm solution of 0.5 g. of 20-ethylenedioxy-pregnane-3,11,20-trione in 30 ml. of anhydrous ether is added over a 30 minute period to a stirred solution of 0.01 mole of phenyl magnesium bromide in 30 ml. of ether and the mixture heated under reflux for two hours. The excess Grignard reagent is decomposed with saturated ammonium chloride solution and extracted with a benzene-ether mixture. The extracts are washed with water, dried and concentrated. The residue is separated by chromatography over 36 g. of neutral alumina using petroleum ether-ether mixtures containing successively larger portions of ether. The 3α-hydroxy compound is eluted first.

This procedure is utilized to prepare 3α-hydroxy and 3β-hydroxy isomers of 20-alkylenedioxy-3-hydroxy-3-phenyl-pregnane-20-one and 17-alkylenedioxy-3-hydroxy-3-phenyl-androstane-17-one in which the alkylenedioxy group contains from two to five carbon atoms.

*Example 2.—3β-hydroxy-3α-phenyl-pregnane-11,20-dione*

A solution of 0.784 g. of 20-ethylenedioxy-3β-hydroxy-3α-phenyl-pregnane-11,20-dione in 20 ml. of 90 acetic acid is allowed to stand overnight at room temperature. The mixture is neutralized with saturated sodium bicarbonate solution and the desired product precipitates.

*Example 3.—3α-hydroxy-3β-phenyl-pregnane-11,20-dione*

A solution of 1.2 g. of 20-ethylenedioxy-3α-hydroxy-3β-phenyl-pregnane-11,20-dione in 31 ml. of 90% acetic acid is allowed to stand overnight at room temperature. The mixture is neutralized with saturated sodium bicarbonate solution. The resulting precipitate is adsorbed on 40 g. of neutral alumina and eluted with ether. The early fractions are identical with the product of Example 2. The later fractions are the desired compound.

The procedures of Examples 2 and 3 are utilized to prepare 3α- and 3β-hydroxy isomers of 3-hydroxy-3-phenyl-pregnane-20-one and 3-hydroxy-3-phenyl-androstane-17-one.

*Example 4.—20-ethylenedioxy-3α-hydroxy-3β-chloroethynyl-pregnane-11,20-dione and 20-ethylenedioxy-3β-hydroxy-3α-chloroethynyl-pregnane-11,20-dione*

A solution of 3.4 g. (2.64 ml.) of cis-1,2-dichloroethylene in 10 ml. of sodium dried ether is added over one-half hour at 0° C. to 6 ml. of a 1,4 N solution of methyl lithium (prepared by adding lithium to methyl iodide in dried ether solution under nitrogen at about 10° C.) in 50 ml. of sodium dried ether. The reaction mixture under nitrogen is stirred for an additional two hours and 100 mg. of 20-ethylenedioxy-pregnane-3,11,20-trione in 10 ml. of sodium dried ether added over a 20 minute period. The mixture is stirred for approximately 15 hours, poured into ice water, filtered and the precipitate extracted with ether.

The ether extracts are washed with water, dried over anhydrous sodium sulfate, filtered and the solvent removed. The residue is chromatographed on neutral alumina using petroleum ether-ether to separate the desired isomers.

The corresponding bromoethynyl compounds are similarly prepared from the same starting material but utilizing 1,2-dibromoethylene in place of the 1,2-dichloroethylene.

The procedure is utilized to prepare both chloroethynyl and bromoethynyl substituted 3α- and 3β-hydroxy isomers of 20-alkylenedioxy-3-hydroxy - 3 - haloethynyl-pregnane-20-one and 17-alkylenedioxy-3-hydroxy - 3 - haloethynyl-androstane-17-one in which the alhylenedioxy group contains from two to five carbon atoms.

*Example 5.—20-ethylenedioxy-3α-hydroxy-3β-ethynyl-pregnane-11,20-dione and 20-ethylenedioxy-3β-hydroxy-3α-ethynyl-pregnane-11,20-dione*

A solution of ethyl magnesium bromide is prepared from 20 g. of magnesium and 80 ml. of ethyl bromide in 200 ml. of tetrahydrofuran. Acetylene is bubbled through a solution of tetrahydrofuran for about one hour to form a saturated solution. The ethyl magnesium bromide is then added at a temperature of 40–50° C. over a period of 0.5 hour to the saturated solution of acetylene in tetrahydrofuran and the mixture is kept at room temperature for an additional two hours during which time the acetylene flow is continued. A solution of 18 g. of 20-ethylenedioxy-pregnane-3,11,20-trione in 200 ml. of tetrahydrofuran is then added to the acetylene magnesium bromide over a period of 20 minutes and the resulting solution is kept at room temperature overnight, the acetylene flow being discontinued three hours after the addition of the steroid. The mixture is then poured into 2 liters of water and extracted with ethyl acetate. The organic layer is washed with water, dried over anhydrous magnesium sulfate and concentrated in vacuo. The residual isomeric mixture is chromatographed as in the previous examples to isolate the desired products.

This procedure is utilized to prepare 3α- and 3β-hydroxy isomers of 20-alkylenedioxy-3-hydroxy-3-ethynyl-pregnane-20-one and 20-alklenedioxy-3-hydroxy-3-ethynyl-androstane-17-one in which the alkylenedioxy group contains from two to five carbon atoms.

*Example 6.—20-ethylenedioxy-3α-hydroxy-3β-methyl-pregnane-11,20-dione and 20-ethylenedioxy-3β-hydroxy-3α-methyl-pregnane-11,20-dione*

Methyl bromide is added to 6.0 g. of magnesium in 400 ml. of ether until all the magnesium is consumed. A solution of 4 g. of 20-ethylenedioxy-pregnane-3,11,20-trione in 50 ml. of ether is added. The mixture is refluxed for one hour and stirred for an additional hour at room temperature. The excess Grignard reagent is decomposed with saturated ammonium chloride solution and extracted with a benzene-ether mixture. The extracts are washed with water, dried and concentrated. The residual isomeric mixture is chromatographed as in the previous examples to isolate the desired products.

This procedure is utilized to prepare alkyl substituted 3α- and 3β-hydroxy isomers of 20-alkylenedioxy-3-hydroxy-3-alkyl-pregnane-20-one and 17-alkylenedioxy-3-hydroxy-3-alkyl-androstane-17-one in which the alkyl group contains up to five carbon atoms and the alkylenedioxy group contains from two to five carbon atoms.

*Example 7.—Hydrolysis of alkylenedioxy groups*

The procedures of Examples 2 and 3 are utilized for hydrolytic removal of the alkylenedioxy groups from the compounds prepared in accordance with the procedures of Examples 1 and 4–6 to prepare the corresponding 17- and 20-oxo compounds.

What is claimed is:

1. 3-haloethynyl-3-hydroxy-androstane-17-ones.
2. 3-haloethynyl-3-hydroxypregnane-20-ones.
3. 17-alkylenedioxy-3-haloethynyl-3-hydroxy-androstane-17-ones.
4. 20-alkylenedioxy-3-haloethynyl-3-hydroxy-pregnane-20-ones.
5. A process for the preparation of 3-haloethynyl-3-hydroxy-androstane-17-ones which comprises reacting a 17-alkylenedioxy-androstane-3,17-dione with a lithium haloethyne and hydrolyzing the resulting compound under acidic conditions.
6. A process for the preparation of 3-haloethynyl-3-hydroxy-pregnane-20-ones which comprises reacting a 20-alkylenedioxy-pregnane-3,20-dione with a lithium haloethyne and hydrolyzing the resulting compound under acidic conditions.
7. A process for the preparation of 17-alkylenedioxy-3-haloethynyl-3-hydroxy-androstane-17-ones which comprises reacting a 17-alkylenedioxy-androstane-3,17-dione with a lithium haloethyne.
8. A process for the preparation of 20-alkylenedioxy-3-haloethynyl-3-hydroxy-pregnane-20-ones which comprises reacting a 20-alkylenedioxy-pregnane-3,20-dione with a lithium haloethyne.

References Cited by the Examiner

UNITED STATES PATENTS

| | | | |
|---|---|---|---|
| 2,713,061 | 7/1955 | Kathol | 260—397.4 |
| 2,713,062 | 7/1955 | Junkmann et al. | 260—397.5 |

LEWIS GOTTS, *Primary Examiner.*

HENRY A. FRENCH, *Assistant Examiner.*